(12) United States Patent
Creager et al.

(10) Patent No.: US 9,086,012 B2
(45) Date of Patent: Jul. 21, 2015

(54) SUPERCHARGER COUPLING

(71) Applicant: Eaton Corporation, Cleveland, OH (US)

(72) Inventors: Christopher W. Creager, Ypsilanti, MI (US); Daniel R. Ouwenga, Portage, MI (US); Matthew J. Fortini, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 269 days.

(21) Appl. No.: 13/768,656

(22) Filed: Feb. 15, 2013

(65) Prior Publication Data

US 2013/0160749 A1 Jun. 27, 2013

Related U.S. Application Data

(63) Continuation-in-part of application No. 12/856,121, filed on Aug. 13, 2010, now Pat. No. 8,464,697.

(51) Int. Cl.
*F02B 33/00* (2006.01)
*F04C 15/00* (2006.01)
(Continued)

(52) U.S. Cl.
CPC .............. *F02B 39/12* (2013.01); *F02B 33/38* (2013.01); *Y10T 29/49236* (2015.01)

(58) Field of Classification Search
CPC .... F02B 39/12; F02B 33/38; Y10T 29/49236
USPC .............. 123/559.1–559.3, 561; 418/69, 181; 192/84.9, 84.1, 84.5, 84.96, 84.961, 192/190 R; 29/893.1, 888.02, 889.2, 525; 475/189

IPC .......................................................... F16H 1/34
See application file for complete search history.

(56) References Cited

U.S. PATENT DOCUMENTS

| 505,025 A | 9/1893 | Brown |
| 879,274 A | 2/1908 | Kramer |

(Continued)

FOREIGN PATENT DOCUMENTS

| AU | 2011100997 A4 * | 11/2011 | ................ F16H 1/34 |
| DE | 3740365 | 6/1989 | |

(Continued)

OTHER PUBLICATIONS

English Abstract of Japanese Publication No. JP1280636, published Nov. 10, 1989.

(Continued)

*Primary Examiner* — Thai Ba Trieu
(74) *Attorney, Agent, or Firm* — Dierker & Associates, P.C.

(57) ABSTRACT

A rotational element coupling device in a supercharger includes a rotatable output shaft having tapered external splines and an output shaft axis of rotation. A coupling disk has a disk axis of rotation coaxial with the output shaft axis of rotation, a tapered internally splined bore coaxial with the disk axis of rotation to engage the tapered external splines, and a plurality of apertures defined in the coupling disk parallel to the disk axis of rotation. A plurality of pins each have a disk end and a timing gear end distal to the disk end. The plurality of pins matingly engages with the coupling disk at the disk end of the pins via the plurality of apertures. A timing gear is fixed to a supercharger rotor for rotation therewith. The timing gear has a plurality of apertures disposed therein to matingly engage with the timing gear end of the plurality of pins.

16 Claims, 5 Drawing Sheets

(51) Int. Cl.
*F04C 13/00* (2006.01)
*F16D 27/00* (2006.01)
*B23P 15/00* (2006.01)
*B23P 15/04* (2006.01)
*B23P 19/02* (2006.01)
*B23P 15/14* (2006.01)
*F02B 39/12* (2006.01)
*F02B 33/38* (2006.01)

(56) References Cited

U.S. PATENT DOCUMENTS

| | | | | |
|---|---|---|---|---|
| 1,803,995 | A | * | 5/1931 | Chilton .......................... 29/525 |
| 2,034,087 | A | * | 3/1936 | Chilton .......................... 92/106 |
| 2,344,078 | A | * | 3/1944 | Brissonnet et al. ........ 123/559.1 |
| 2,692,035 | A | * | 10/1954 | Rabinow ................... 192/111.1 |
| 2,944,647 | A | | 7/1960 | Twyman |
| 3,036,680 | A | | 5/1962 | Jaeschke |
| 3,143,366 | A | * | 8/1964 | Nichols .......................... 403/16 |
| 3,216,542 | A | * | 11/1965 | Comstock ................... 192/21.5 |
| 3,312,319 | A | | 4/1967 | Carroll et al. |
| 3,450,243 | A | * | 6/1969 | Kraeling ........................ 192/97 |
| 3,736,079 | A | | 5/1973 | Kantz |
| 3,742,656 | A | * | 7/1973 | Amos ............................ 464/88 |
| 3,945,476 | A | | 3/1976 | de Jong |
| 4,131,375 | A | * | 12/1978 | Fisher ............................ 29/432 |
| 4,343,563 | A | * | 8/1982 | Bernhagen .................... 29/525 |
| 4,519,373 | A | | 5/1985 | Hardy et al. |
| 4,561,390 | A | * | 12/1985 | Nakamura et al. ........ 123/90.15 |
| 4,570,768 | A | | 2/1986 | Nishimura et al. |
| 5,048,366 | A | * | 9/1991 | Spanio ............................ 74/567 |
| 5,052,534 | A | | 10/1991 | Gustin et al. |
| 5,133,325 | A | | 7/1992 | Winkelmann |
| 5,141,090 | A | * | 8/1992 | Trojan ........................ 192/84.5 |
| 5,273,409 | A | | 12/1993 | Swain |
| 5,277,289 | A | * | 1/1994 | Dax ........................... 192/58.5 |
| 5,281,116 | A | * | 1/1994 | Gwin ............................ 418/94 |
| 5,588,821 | A | * | 12/1996 | Kinoshita .................... 418/270 |
| 5,609,232 | A | | 3/1997 | Brownfield et al. |
| 5,743,367 | A | * | 4/1998 | Hofmann et al. ........ 192/109 R |
| 5,752,810 | A | | 5/1998 | Hein |
| 6,289,882 | B1 | | 9/2001 | Slicker |
| 6,331,103 | B1 | | 12/2001 | Teraoka |
| 6,375,442 | B1 | | 4/2002 | Ward et al. |
| 6,634,344 | B2 | | 10/2003 | Stretch |
| 6,796,126 | B2 | * | 9/2004 | Hasegawa et al. ......... 123/559.1 |
| 6,837,195 | B2 | | 1/2005 | Suwazono |
| 7,462,105 | B2 | | 12/2008 | Lattin |
| 8,464,697 | B2 | * | 6/2013 | Ouwenga et al. .......... 123/559.3 |
| 2003/0116397 | A1 | * | 6/2003 | Ima ............................. 192/48.91 |
| 2007/0062498 | A1 | * | 3/2007 | Woods ....................... 123/559.1 |
| 2007/0265132 | A1 | | 11/2007 | Antonov |
| 2008/0053417 | A1 | | 3/2008 | Eybergen et al. |
| 2009/0032357 | A1 | * | 2/2009 | Yoshida et al. ............. 192/84.1 |
| 2011/0212657 | A1 | * | 9/2011 | Tsunekawa et al. ............ 440/75 |
| 2012/0037473 | A1 | * | 2/2012 | Ouwenga .................... 192/84.9 |
| 2012/0186930 | A1 | * | 7/2012 | Salvia et al. ............... 192/66.31 |
| 2014/0179479 | A1 | * | 6/2014 | Nichols et al. ............... 475/189 |
| 2014/0334959 | A1 | * | 11/2014 | Franke et al. .................. 418/69 |
| 2015/0047617 | A1 | * | 2/2015 | Benjey et al. .............. 123/559.3 |

FOREIGN PATENT DOCUMENTS

| | | | |
|---|---|---|---|
| DE | 102005035298 | | 2/2007 |
| EP | 20314 | A1 * | 12/1980 ............... F16H 1/34 |
| EP | 0545189 | | 6/1993 |
| EP | 0557598 | | 9/1993 |
| FR | 2476208 | | 8/1981 |
| JP | 1280636 | | 11/1989 |
| JP | 2185625 | | 7/1990 |
| WO | WO 99/49229 | | 9/1999 |

OTHER PUBLICATIONS

English Abstract of German Publication No. DE3740365, published Jun. 8, 1989.

English Abstract of Japanese Publication No. JP2185625, published Jul. 20, 1990.

English Abstract of European Publication No. EP0557598, published Sep. 1, 1993.

European Patent Office, International Search Report and Written Opinion issued in counterpart International Application No. PCT/IB2011/001852, dated Dec. 29, 2011.

* cited by examiner

SUPERCHARGER COUPLING

CROSS-REFERENCE TO RELATED APPLICATIONS

This application is a continuation-in-part of co-pending U.S. patent application Ser. No. 12/856,121, filed Aug. 13, 2010, which is incorporated by reference herein in its entirety.

BACKGROUND

Superchargers may be used to increase or "boost" the air pressure in the intake manifold of an internal combustion (IC) engine to increase the horsepower output of the IC engine. The IC engine may thus have an increased horsepower output capability than would otherwise occur if the engine were normally aspirated (e.g., the piston would draw air into the cylinder during the intake stroke of the piston). A conventional supercharger is generally mechanically driven by the engine, and therefore, may represent a drain on engine horsepower whenever engine "boost" may not be required and/or desired. A selectively engageable clutch may be disposed in series between the supercharger input (e.g., a belt driven pulley) and the rotors of the supercharger. A transmission may be disposed in series between the clutch and the rotors of the supercharger.

SUMMARY

A rotational element coupling device in a supercharger includes a rotatable output shaft having tapered external splines and an output shaft axis of rotation. A coupling disk has a disk axis of rotation coaxial with the output shaft axis of rotation, an internally splined bore coaxial with the disk axis of rotation to engage the tapered external splines, and a plurality of disk apertures defined in the coupling disk parallel to the disk axis of rotation. A plurality of pins each have a disk end and a timing gear end distal to the disk end. The plurality of pins matingly engages with the coupling disk at the disk end of the pins via the plurality of apertures. A timing gear is fixed to a supercharger rotor for rotation therewith. The timing gear has a plurality of timing gear apertures disposed in the timing gear and matingly engaged with the timing gear end of the plurality of pins.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

DETAILED DESCRIPTION

The present disclosure relates generally to a supercharger clutch assembly and a supercharger rotational element coupling device.

Figure 1:
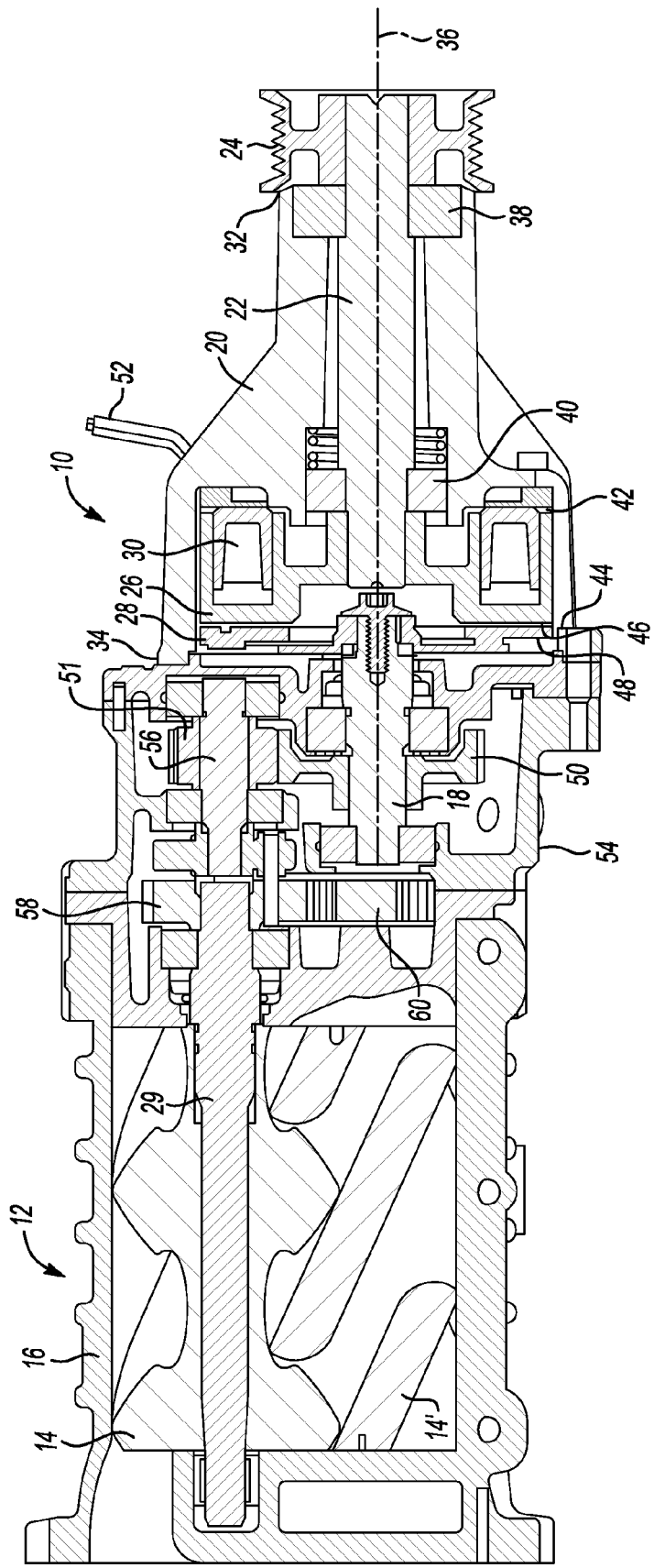
FIG. 1 is a cross-sectional view of a supercharger according to an example of the present disclosure.

A clutch assembly 10 according to an example of the present disclosure is shown in FIG. 1. The clutch assembly 10 is configured for use with a supercharger 12 in accordance with an example of the present disclosure. The supercharger 12 may be part of an intake manifold assembly for an engine (not shown). The engine may include a plurality of cylinders and a reciprocating piston disposed within each cylinder, thereby defining an expandable combustion chamber. The engine may include intake and exhaust manifold assemblies for directing combustion fluid to and from the combustion chamber by way of intake and exhaust valves, respectively.

The supercharger 12 of the intake manifold assembly may be any positive displacement pump, including the Roots type blower supercharger as illustrated and described in U.S. Pat. Nos. 5,078,583 and 5,893,355 which are owned by the assignee of the present disclosure and which are hereby incorporated by reference in their entirety, but are not necessarily limited thereto. The supercharger 12 may also comprise a screw compressors or any other type of positive displacement pump. In accordance with an example of the present disclosure, the supercharger 12 may include a plurality (e.g., pair) of rotors 14, each having a plurality of meshed lobes. The rotors may be disposed in a plurality of parallel, transversely overlapping cylindrical chambers and may be driven by engine crankshaft torque transmitted thereto (e.g., via a drive belt). The supercharger 12 may include a main housing 16 that may define the plurality of cylindrical chambers. The main housing 16 may also be referred to as the rotor housing. The mechanical drive of the supercharger 12, including shaft 18, may rotate the rotors 14 at a fixed ratio, relative to the crankshaft speed, such that the displacement of the supercharger 12 is greater than the engine displacement, thereby boosting or supercharging the air flowing into the combustion chamber of the engine. The supercharger 12 may include an inlet port configured to receive fluid from an inlet duct or passage and an outlet port configured to direct the charged air to the intake valves via a discharge duct. The inlet duct or passage and the discharge duct may be interconnected by means of a bypass passage. A bypass valve may be disposed within the bypass passage and may be configured to be moved between an open position and a closed position by means of an actuator assembly.

The supercharger 12 may be coupled to a clutch assembly 10 in any suitable manner. The supercharger 12 may further include an input housing that serves as a clutch housing 20 for the clutch assembly 10. Clutch assembly 10 includes clutch housing 20, a shaft 22, a pulley 24, a clutch rotor 26, a clutch armature 28, and a clutch coil 30. The clutch housing 20 may be configured to house other components of the clutch assembly 10. Clutch housing 20 may be smaller in diameter at a first end 32 and larger in diameter at a second end 34. The first end 32 may be proximate pulley 24. The second end 34 may be proximate the main housing 16 of the supercharger 12.

Figure 2:
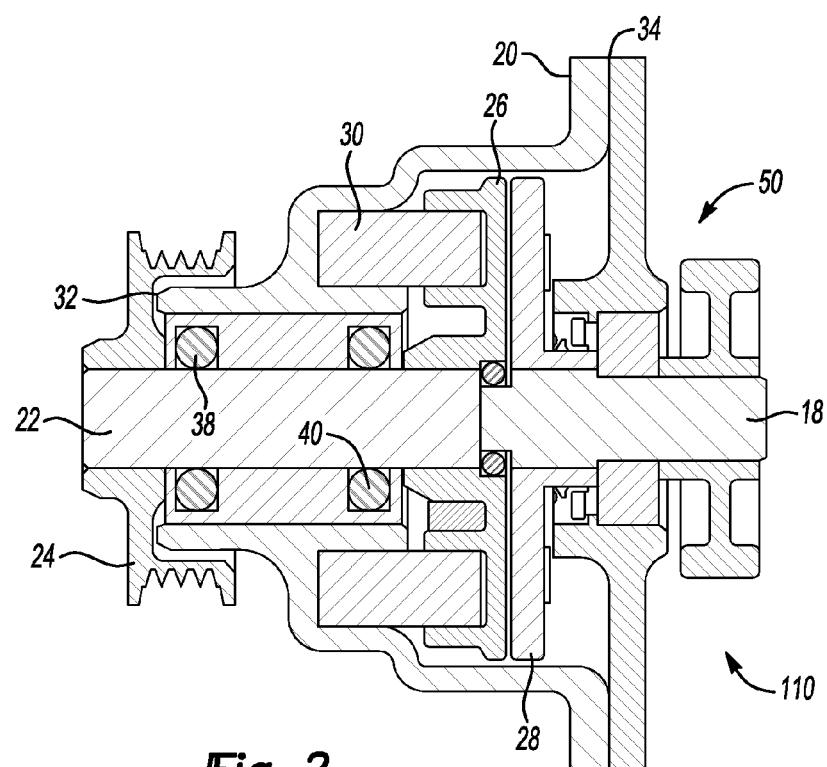
FIG. 2. is a cross-sectional view of a clutch assembly according to an example of the present disclosure.
Figure 3:
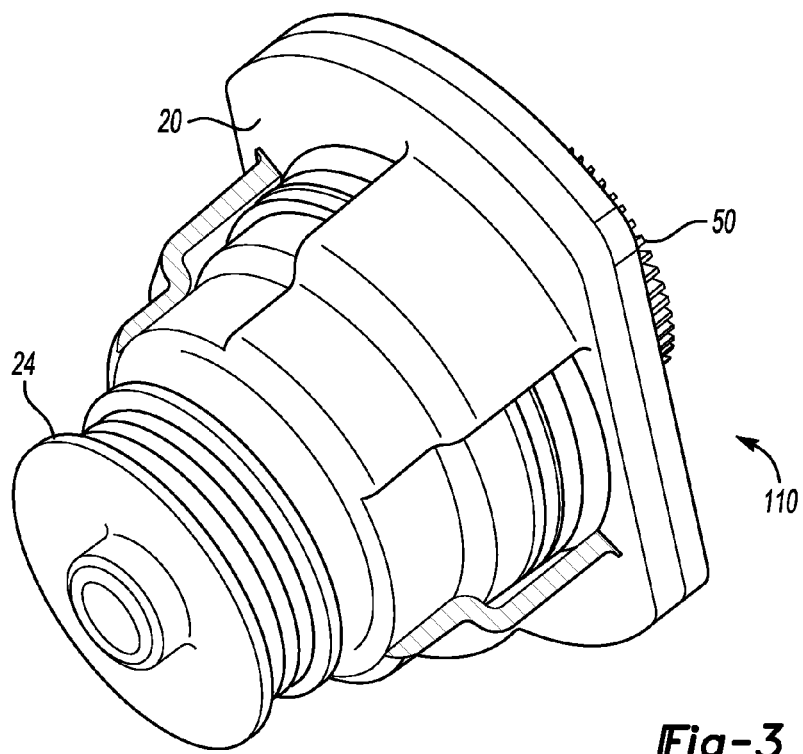
FIG. 3 is a perspective view of the clutch assembly depicted in FIG. 2 according to an example of the present disclosure.
Figure 4:
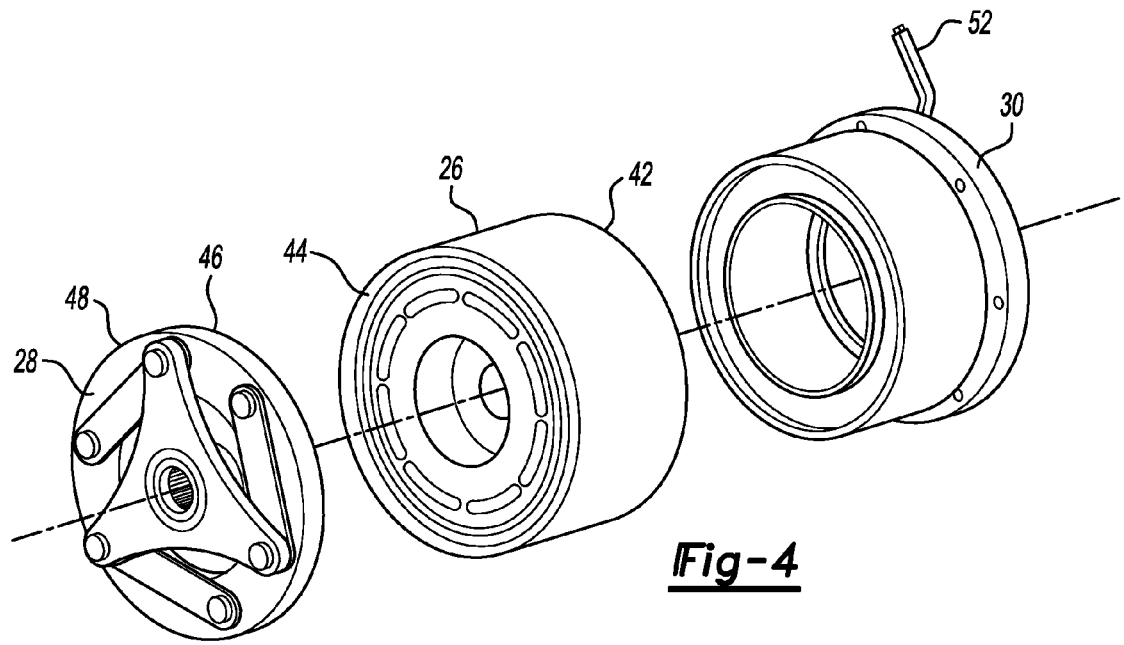
FIG. 4 is an exploded perspective view of a clutch armature, clutch rotor, and clutch coil of a clutch assembly according to an example of the present disclosure.

Shaft 22 may also be referred to as a pulley-drive shaft. Shaft 22 may have a longitudinal axis 36 about which shaft 22 may rotate. Shaft 22 may be supported within clutch housing 20 by at least one bearing 38. For example and without limitation, shaft 22 may be supported within clutch housing 12 by a plurality (e.g., pair) of bearings 38, 40. The bearings 38, 40 may be disposed between the clutch housing 20 and shaft 22. Referring now to FIGS. 2-3, an alternative example of the clutch assembly 110 is generally illustrated. As generally illustrated in FIGS. 2-3, at least a portion of the pulley 24 may circumferentially surround at least one bearing 38. By locating pulley 24 directly over at least one bearing 38, the other bearing 40 may not need to be configured to support a radial load exerted by the pulley 22. Each of the bearings 38, 40 may comprise an inner race and an outer race in accordance with an example of the present disclosure. There may be substantially no relative motion between the inner race and the outer race of the bearings 38, 40 when the clutch assembly 10, 110 is engaged.

Referring now to FIGS. 1-3 and 5, the pulley 24 may be configured to transmit torque from the engine crankshaft (not shown) to shaft 22 during engagement of the clutch assembly 10. The pulley 24 may be connected to shaft 22. The pulley 24 may be disposed externally to shaft 22 in accordance with an example of the present disclosure. The pulley 24 may be disposed at an end of shaft 22 and may circumferentially surround shaft 22. The pulley 24 may be external to the clutch housing 20 in accordance with an example of the present disclosure. The pulley 24 may be axially spaced along the longitudinal axis 36 from the clutch housing 20. In accordance with an example of the present disclosure, at least one bearing 38 that is disposed between the clutch housing 20 and shaft 22 may be proximate the pulley 22. Another bearing 40 may be disposed between the clutch housing 20 and shaft 22 closer toward the main housing 16 of the supercharger 12. The pulley 24 may be separated from (i.e., not integral with) other components of the clutch assembly 10. For example, the pulley 24 may be separated from (i.e., not integral with) the clutch armature 28.

The pulley 24 may have a diameter that is independent of the diameters of the clutch rotor 26, the clutch armature 28, and the clutch coil 30. The pulley 24, including its design and configuration, is independent of the torque capacity of the clutch rotor 26, the clutch armature 28, and the clutch coil 30. In accordance with a certain torque capacity of the supercharger 12, the pulley 24 may have a diameter that is less than about 85 mm in accordance with an example of the present disclosure. The pulley 24 may have a diameter that is between about 45 mm and about 85 mm in accordance with an example of the present disclosure. Based on the diameter of the pulley 24, the pulley 24 may conventionally be considered a small pulley. The pulley 24 may have a diameter that is smaller than the diameter of the clutch coil 30 in accordance with an example of the present disclosure, as the pulley 24 may not surround the clutch coil 30 in accordance with an example of the present disclosure. The pulley 24 may also not be integrated with clutch rotor 26 in accordance with an example of the present disclosure.

The clutch rotor 26 may be configured to be magnetized and set up a magnetic loop that attracts the clutch armature 28. The clutch rotor 26 may be connected to shaft 22 and/or pulley 24 in accordance with an example of the present disclosure. The clutch rotor 26 may rotate around the longitudinal axis 36 of shaft 22. The clutch rotor 26 is not connected to shaft 18 of the supercharger as may be conventional in small pulley designs. The clutch rotor 26 may comprise steel in accordance with an example of the present disclosure. Although steel is mentioned in detail for one example of the present disclosure, the clutch rotor 26 may comprise any number of other materials in accordance with other examples of the present disclosure. The clutch rotor 26 may rotate at rotational speeds that are at least the same as the pulley 24 and may rotate at rotational speeds greater than those capable by the clutch armature 28 in an example of the present disclosure. Because the clutch rotor 26 may be connected to shaft 22 and/or pulley 24, the clutch rotor 26 may always maintain the same rotational speed as the pulley 24 in accordance with an example of the present disclosure. In other words, the clutch rotor 26 may rotate at a rotational speed that is substantially the same as the rotational speed of shaft 22 even when the clutch assembly 10 is disengaged. The clutch rotor 26 may generally be more stable at higher speeds than the clutch armature 28. The clutch rotor 26 may be disposed between the clutch armature 28 and the clutch coil 30 along the longitudinal axis 36 of shaft 22. The clutch rotor 26 may have a first face 42 that is configured to at least partially surround the clutch coil 30. The clutch rotor 26 may have a second face 44 (i.e., opposing the first face 42) that is configured to face the clutch armature 28.

The clutch armature 28 may rotate around the longitudinal axis 36 of shaft 22. The clutch armature 28 may be configured to be pulled against the clutch rotor 26 and apply a frictional force at contact. The load of the clutch armature 28 may thus be accelerated to match the rotational speed of the clutch rotor 26. The clutch armature 28 may be disposed between the clutch rotor 18 and the supercharger 12 along the longitudinal axis 36 of shaft 22. The clutch armature 28 may have a first face 46 that is configured to face the second face 44 of the clutch rotor 26 and may include a friction material. The clutch armature 28 may have a second face 48 (i.e., opposing the first face 44) that is configured to face the supercharger 12. The clutch armature 28 may be connected to shaft 18 of supercharger 12 through a spline and bolt. The clutch armature 28 may contain speed sensitive components (e.g., friction materials and springs) in accordance with an example of the present disclosure. The rotational speed of the clutch armature 28 may be less than the rotational speed of shaft 22 when the clutch assembly 10, 110 is disengaged. Accordingly, the clutch armature 28 may be configured to coast down to a stop in accordance with an example of the present disclosure when the clutch assembly 10, 110 is disengaged, rather than always having to maintain the same rotational speed as the pulley 24. Clutch armature 28 may not be connected to shaft 22 and/or pulley 24 in an example of the present disclosure. Instead, clutch armature 28 may be separated from the pulley 24 in accordance with an example of the present disclosure. Clutch armature 20 may be connected to shaft 18 of the supercharger 12. Shaft 18 may be referred to as a step-up input shaft 18. The rotational speed of the clutch armature 28 may be substantially the same as the rotational speed of shaft 22 when the clutch assembly 10, 110 is engaged. Because it may be more difficult to keep the clutch armature 28 stable at higher speeds because of the inclusion of speed sensitive material, like the friction material, the clutch armature 28 may not be connected to shaft 22 and/or pulley 24. The clutch armature 28 may be separated from the pulley 24, and therefore, the clutch armature 28 may not influence the size and/or range of the pulley 24. By separating the clutch armature 28 from the pulley 24, the size of the clutch housing 20 in the area around the pulley 24 may be decreased. Furthermore, the size and configuration of the pulley 24 may not depend on the size and/or torque capacity of the armature 28.

The clutch coil 30 may comprise a source of magnetic flux. An electrical current and/or voltage may be applied to the clutch coil 30 to generate a magnetic field in the vicinity of the clutch coil 30 and produce magnetic lines of flux. The intensity of the magnetic field may be proportional to the level of current provided. This flux may then be transferred through the small working air gap between the clutch coil 30 and the clutch rotor 26. The clutch rotor 26 may thus become magnetized and set up a magnetic loop that attracts the clutch armature 28. The clutch armature 28 may then be pulled against the clutch rotor 26 and a frictional force may be applied at contact and the load on the clutch armature 28 may be accelerated to match the speed of the clutch rotor 26. When current and/or voltage is removed from the clutch assembly 10, 110, the clutch armature 28 may be free to turn with the shaft 18 of supercharger 12. The clutch coil 30 may not be surrounded by pulley 24. Instead, the clutch coil 30 may be mounted in the clutch rotor 26 and may be located closer to the housing 16 of the supercharger 12. The clutch coil 30 may be disposed between the clutch rotor 26 and the clutch housing 20 in a direction along the longitudinal axis 36 of shaft 22. The clutch coil 30 may be spaced along the longitudinal axis 36 of shaft 22 from the pulley 24. The clutch coil 30 may be separated from the pulley 24, and therefore, the clutch coil 30 may not influence the size and/or range of the pulley 24. By separating the clutch coil 30 from the pulley 24, the size of the clutch housing 20 in the area around the pulley 24 may be decreased. Furthermore, the size and configuration of the pulley 24 may not depend on the size and/or torque capacity of the clutch coil 30.

The clutch coil 30 may be controlled by an electronic control unit (ECU) (not shown) that provides an electrical signal to the clutch coil 30 (e.g., via wires 52). The ECU may process input, such as for example (but not limited to), sensor readings corresponding to vehicle parameters and process the input according to log rules to determine the appropriate electrical signal to provide to clutch coil 30. The ECU may comprise a microprocessor having sufficient memory to store the logic rules (e.g., in the form of a computer program) for controlling operation of the clutch assembly 10, 110.

A supercharger 12 including a clutch assembly 10, 110 in accordance with an example of the present disclosure may further include an input step-up gear 50 connected to shaft 18 of the supercharger 12. Accordingly, at least one of the rotors 14 of the supercharger 12 may utilize an input drive configuration including for example and without limitation, shaft 18 and step up gear 50, by means of which the supercharger 12 may receive input drive torque. A supercharger 12 in accordance with an example of the present disclosure may include the clutch assembly 10, 110; housing 16; a plurality of rotors 14 disposed within housing 16; shaft 18 configured to drive rotation of the plurality of rotors 14; and input step-up gear 50 connected to shaft 18. Step-up gear 50 and related components are discussed more fully below.

Examples of the rotational element coupling device and method disclosed herein may provide the benefit of misalignment compensation and may reduce or substantially eliminate backlash within a supercharger. It is to be understood that examples of the rotational element coupling device and method disclosed herein may prevent some types of damage to bearings that may occur in some superchargers during assembly.

Referring further to FIG. 1, supercharger 12 includes a supercharger transmission 54. The supercharger transmission 54 includes input step-up gear 50 and an output step-up gear 51 to provide a drive ratio from step-up input shaft 18 to an output shaft 56. Pulley 24 drives a pulley-drive shaft 22 in the supercharger 12 to deliver torque to input step-up gear 50. The pulley 24 may be driven by an engine crankshaft pulley (not shown) connected to the pulley 24 via a front end accessory drive (FEAD) belt (not shown). Clutch assembly 10 may be disposed between the pulley-drive shaft 22 and the input step-up gear 50 to selectively connect the step-up input shaft 18 to the input step-up gear 50. The input step-up gear 50 meshingly engages output step-up gear 51 that is fixed to output shaft 56 for rotation therewith.

The drive ratio of step-up gears 50 and 51 provides a rotational speed differential between the step-up input shaft 18 and the output shaft 56. A range of drive ratios from about 1:1 to about 3:1 may be used according to examples of the present disclosure. For example, if using a 2:1 drive ratio, when the step-up input shaft 18 spins at 1,000 revolutions per minute (rpm), the rotor 14 may spin at 2,000 rpm because the rotor 14 rotates with output shaft 56 as discussed in further detail below.

The output shaft 56 may be indirectly connected to a driving timing gear 58 by an indirect shaft configuration, discussed in further detail below. The driving timing gear 58 is meshingly engaged with a driven timing gear 60. Driving timing gear 58 is connected to rotor 14. Driven timing gear 60 is connected to rotor 14'. The timing gears 58, 60 may include an equal number of gear teeth spaced at a relatively high tooth pitch. For example, timing gears 58, 60 may each have 30 teeth for meshing engagement with one another; therefore timing gears 58, 60 rotate with a substantially equal angular velocity therebetween. As such, the timing gears 58, 60 substantially synchronize the rotors 14, 14', thereby contributing to a low wear rate of the rotors 14, 14' and high efficiency of the supercharger 12.

An indirect shaft configuration as used herein generally means a driveline power flow arrangement having a shaft separated by at least one component from its source, i.e., having an indirect connection. For example, where a direct shaft configuration uses one shaft to transfer rotational power directly from an input to an output, an indirect shaft configuration uses an additional shaft connected in series with a coupling to transfer rotational power according to an example of the present disclosure. In an example of a direct shaft configuration, an output shaft may be fixed directly to a supercharger rotor—the output shaft would also serve as the rotor shaft.

Figure 6:
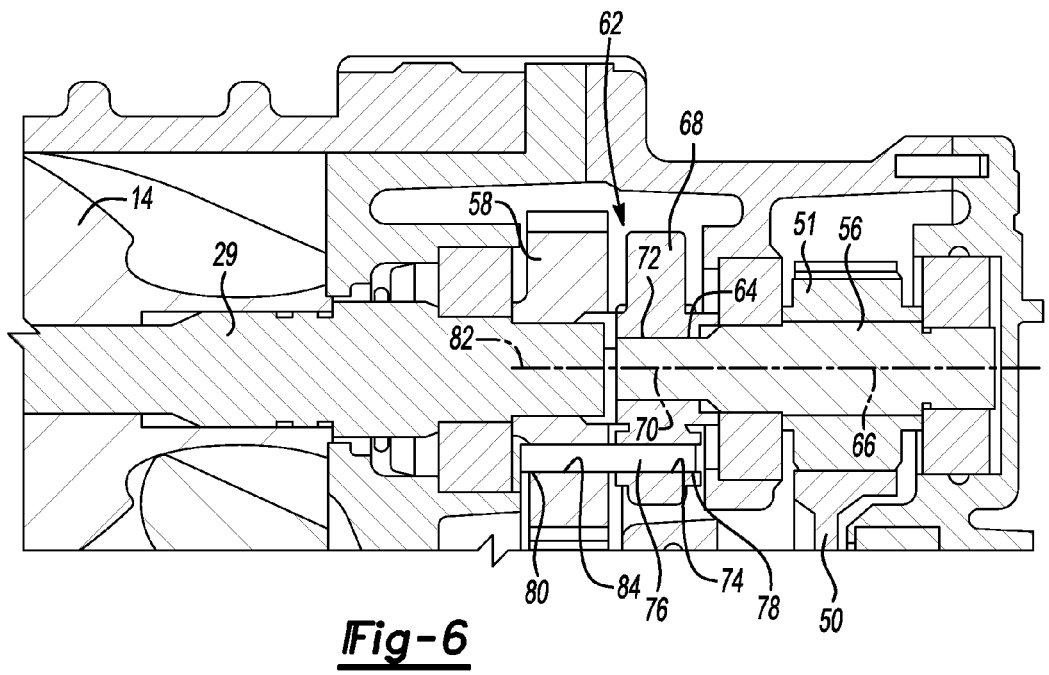
FIG. 6 is a cross-sectional view depicting a supercharger coupling according to an example of the present disclosure.

Referring now also to FIG. 6 for further detail of supercharger 12, a rotational element coupling device 62 includes output shaft 56 and driving timing gear 58, having operability to transfer rotational power therebetween. The output shaft 56 has tapered external splines 64 and an output shaft axis of rotation 66. A coupling disk 68 of coupling device 62 has a disk axis of rotation 70 coaxial with the output shaft axis of rotation 66. The coupling disk 68 has a tapered internally splined bore 72 coaxial with the disk axis of rotation 70 to engage the tapered external splines 64 of the output shaft 56. The splined internally splined bore 72 is tapered along the disk axis of rotation 70.

Figure 8:
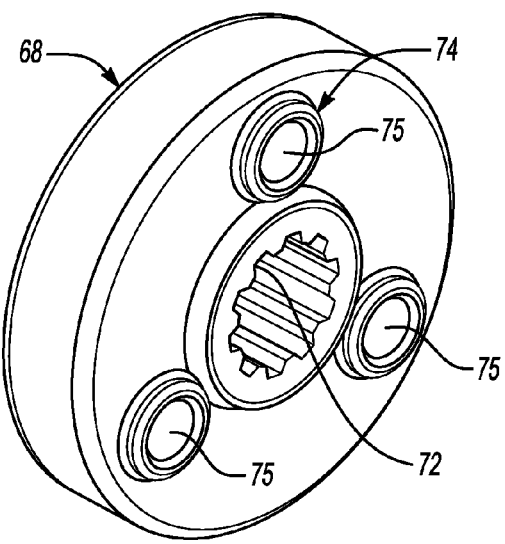
FIG. 8 is a perspective view of an example of a coupling disk according to the present disclosure.

FIG. 8 is a perspective view depicting an example of a coupling disk 68 according to the present disclosure. FIG. 8 depicts the plurality of disk apertures 74 having three apertures 75. In other examples, the number of disk apertures 75 in the plurality of disk apertures 74 may be greater than 3 or less than 3.

Figure 9:
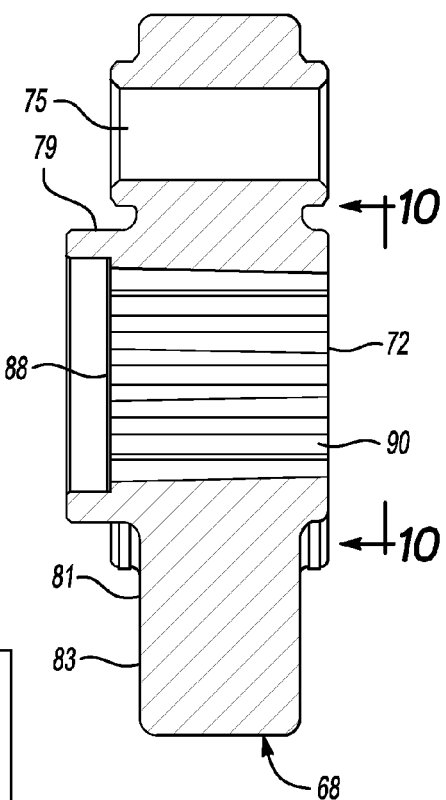
FIG. 9 is a cross-sectional view of the example of the coupling disk depicted in FIG. 8.

The tapered internally splined bore 72 of coupling disk 68 is further described with reference to FIG. 9. The internally splined bore 72 has a larger diameter end 88, and a smaller diameter end 90. The coupling disk 68 may have a hub 79 defined around the internally splined bore 72. As depicted in FIG. 9, the hub 79 may extend beyond the face 83 of the coupling disk 68 substantially more on a hub side 81 than on an opposite side. The hub 79 may be an easily detectable feature (for example, visibly detectable, or detectable by process poke-yoke) to facilitate verification that a free end 86 of the output shaft 56 (see FIG. 11) is passed through the larger diameter end 88 toward the smaller diameter end 90 when the output shaft 56 is seated in the coupling disk 68. The tapered internally splined bore 72 has tapered involute splines defined thereon for engagement with the tapered external splines 64 of the output shaft 56. The tapered external splines 64 are also involute splines. The tapered external splines 64 engage the tooth flanks of the tapered involute splines of the tapered internally splined bore 72 in a side-fit engagement. Since the internal involute splines and the external involute splines are in side-fit engagement, the splines find and centralize the axis between the output shaft 56 and the coupling disk 68. The taper of the splines allows the splines to be seated to an interference fit between the internal and external splines with relatively low force to seat the output shaft 56 in the coupling disk 68.

The tapered internally splined bore 72 and the tapered external splines 64 of the output shaft 56 may be each tapered from about 0.5 degrees to about 2.5 degrees per side with respect to the disk axis of rotation 70 and the output shaft axis of rotation 66 respectively to render an interference fit between the output shaft 56 and the internally splined bore 72.

Figure 10:
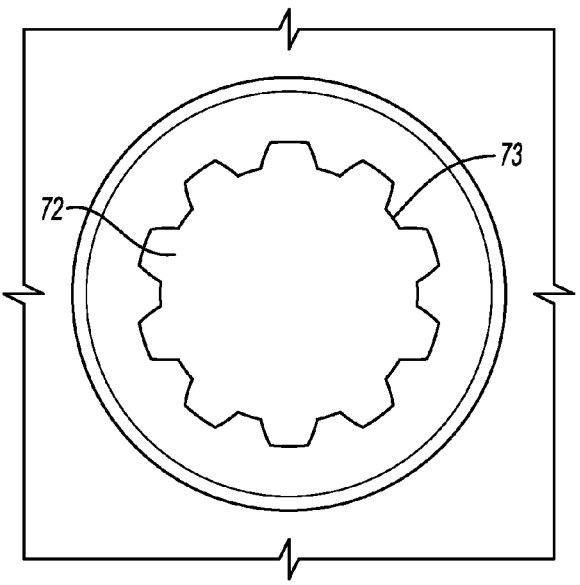
FIG. 10 is an enlarged cutaway view showing internal involute splines disposed in the internally splined bore in an example of a coupling disk according to the present disclosure.

FIG. 10 is an enlarged cutaway view showing an example of internal involute splines 73 disposed in the internally splined bore 72.

In an example of the present disclosure, a force to seat the output shaft 56 in the coupling disk 68 ranges from about 5 Newtons to about 44 Newtons. Without being held bound to any theory, it is believed that the taper of the splines allows a tight, interference fit between the splines to be achieved without a large amount of force. The tight, interference fit may prevent relative motion between the output shaft 56 and the coupling disk, thereby preventing backlash at the joint between the output shaft 56 and the coupling disk 68.

The coupling disk 68 includes a plurality of disk apertures 74 defined in the coupling disk 68 parallel to the disk axis of rotation 70. It is to be understood that even though only one of the plurality of disk apertures 74 is shown by representation in FIG. 2, the plurality of disk apertures 74 is disposed radially about disk axis of rotation 70 as shown in FIG. 8.

The coupling disk 68 may be formed from any suitable material. Examples of materials for coupling disk 68 include polymers such as polyether ether ketone (PEEK), and metals including steel alloys and aluminum alloys. An example of a suitable steel alloy is SAE (Society of Automotive Engineers)/AISI (American Iron and Steel Institute) 1144.

The coupling device 62 further includes a plurality of pins 76 each having a disk end 78 and a timing gear end 80 distal to the disk end 78. The plurality of pins 76 may be matingly engaged with the coupling disk 68 at the disk end 78 of the pins 76 via the plurality of disk apertures 74. It is to be understood that the plurality of pins 76 may be steel. The plurality of pins 76 may be three pins and may be substantially equally spaced apart along a circular pattern within respective disk apertures of the plurality of disk apertures 74. Further, the plurality of pins 76 may range in size from about 6 mm to about 10 mm in diameter and from about 20 mm to about 25 mm in length.

The driving timing gear 58 is fixed to rotor 14 for rotation therewith. The driving timing gear 58 has a timing gear axis of rotation 82 and a plurality of timing gear apertures 84. It is to be understood that even though only one of the plurality of timing gear apertures 84 is shown by representation in FIG. 6, the plurality of timing gear apertures 84 are disposed radially about timing gear axis of rotation 82. The plurality of pins 76 may be matingly engaged with the driving timing gear 58 at the timing gear end 80 of the pins 76 via the plurality of timing gear apertures 84.

Figure 11:
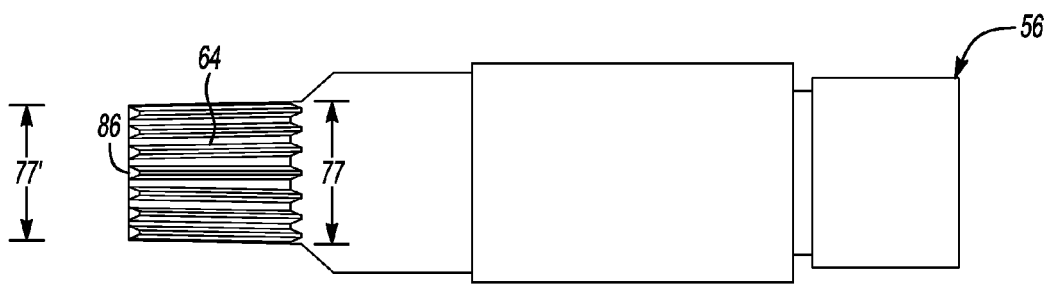
FIG. 11 depicts an output shaft in an example of the present disclosure.

In an example, the coupling device 62 may accommodate a parallel misalignment from about 0.05 mm (millimeter) to about 0.1 mm between the output shaft axis of rotation 66 and the timing gear axis of rotation 82. Misalignment between the output shaft axis of rotation 66 and the timing gear axis of rotation 82 is accommodated by compliance in supercharger 12 rather than building in tolerance gaps in mating parts. This eliminates backlash in the joint between the output shaft 56 and the coupling disk 68. FIG. 11 depicts an example of an output shaft 56 according to the present disclosure. Tapered external splines 64 are depicted at a free end 86 of the output shaft 56. The external splines 64 are tapered so that the free end output shaft diameter 77' at the free end 86 is smaller than the output shaft diameter depicted by reference numeral 77 measured at the ends of the splines distal to the free end 86.

Figure 7:
FIG. 7 is a flow diagram representing an example of a method according to the present disclosure.
Figure 5:
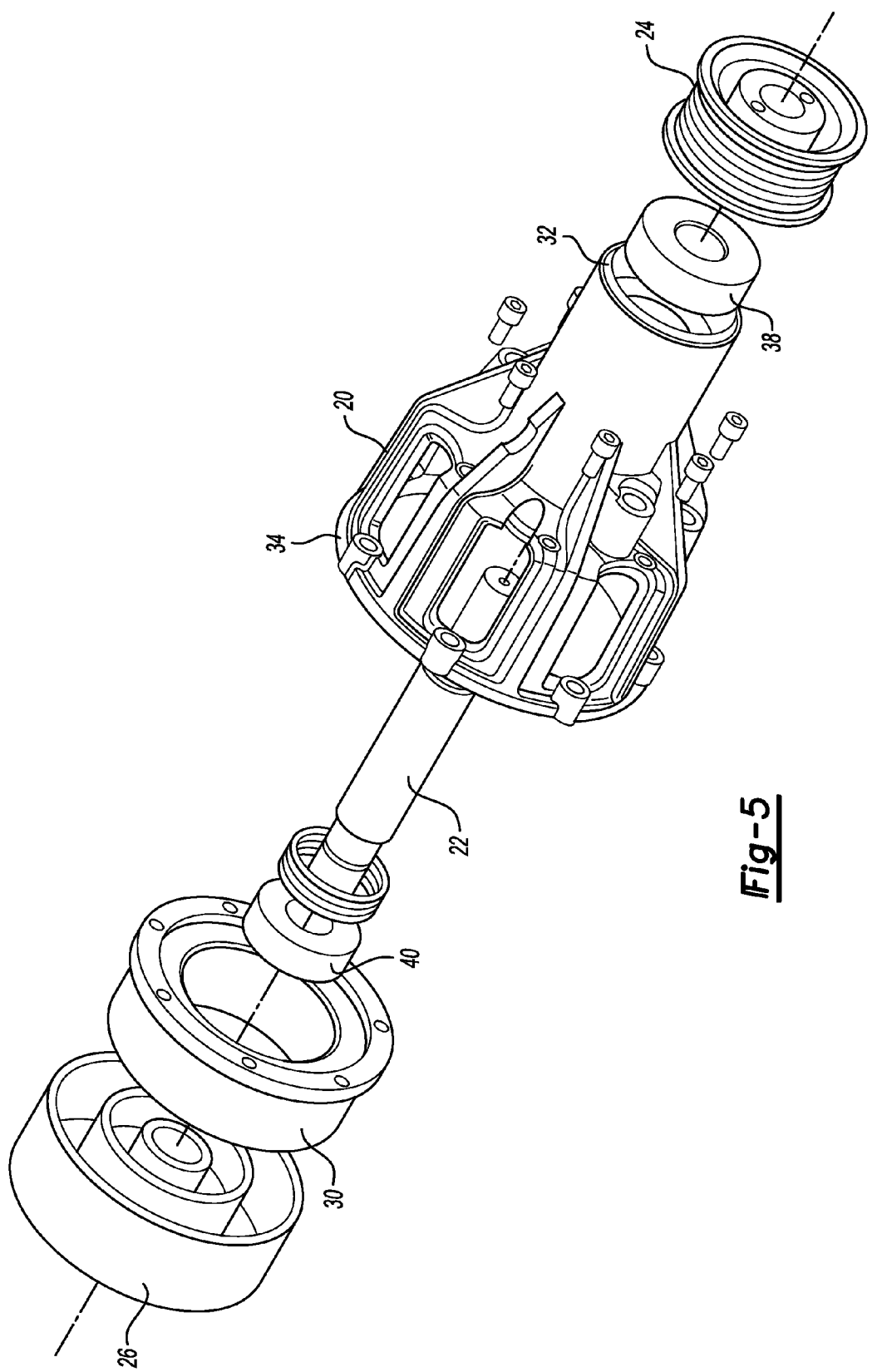
FIG. 5 is an exploded perspective view of a portion of a clutch assembly according to an example of the present disclosure.

Referring to FIG. 7, an example method of making a supercharger 12 is depicted by a flow chart 100. Box 101 represents the method step of disposing a rotatable output shaft 56 in a supercharger housing 11. The rotatable output shaft 56 may be supported by bearings. The rotatable output shaft 56 may also have external splines 64 and an output shaft axis of rotation 66. The supercharger housing 11 may include multiple components of the supercharger 12 that provide external surfaces of the supercharger 12 and form supporting structure for internal components of the supercharger 12. For example, the supercharger housing 11 may include housing components for the rotor assembly 27 and the supercharger transmission 54 along with appropriate connections, covers, mounting points, seals, and fasteners.

Box 102 represents pressing coupling disk 68 on the output shaft 56. The coupling disk 68 may have a disk axis of rotation 70 coaxial with the output shaft axis of rotation 66, an internally splined bore 72 coaxial with the disk axis of rotation 70 to engage the external splines 64, and a plurality of disk apertures 74 defined in the disk 68 parallel to the disk axis of rotation 70.

At box 103, the method further includes the step of disposing in the supercharger housing 11 a rotor assembly 27 including a rotor shaft 29.

At box 104, the method further includes disposing a timing gear 58 on the rotor shaft 29, the timing gear having a timing gear axis of rotation 82 and a plurality of timing gear apertures 84 disposed in the timing gear 58.

At box 105, the method further includes the step of coupling the timing gear 58 to the coupling disk 68 via a plurality of pins 76. The plurality of pins 76 each has a disk end 78 and a timing gear end 80 distal to the disk end 78. The coupling is accomplished by matingly engaging the plurality of pins 76 with the coupling disk 68 at the disk end 78 of the pins 76 via the plurality of disk apertures 74 and matingly engaging the plurality of pins 76 with the timing gear 58 at the timing gear end 80 of the plurality of pins 76 via the plurality of timing gear apertures 84.

It is believed that examples of the present disclosure allow assembly of the supercharger 12 with a substantially reduced potential for damaging bearings during assembly. In particular, the bearings that support the output shaft 56 are less subject to brinnelling damage because the axial output shaft loads during assembly are relatively low in examples of the present disclosure.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 6 mm to about 10 mm should be interpreted to include not only the explicitly recited limits of about 6 mm to about 10 mm, but also to include individual values, such as 7 mm, 8.2 mm, 9.1 mm, etc., and sub-ranges, such as from about 6 mm to about 7.5 mm, etc. Furthermore, when "about" is utilized to describe a value, this is meant to encompass minor variations (up to +/−10%) from the stated value.

While multiple examples have been described in detail, it will be apparent to those skilled in the art that the disclosed examples may be modified. Therefore, the foregoing description is to be considered non-limiting.

What is claimed is:

1. A rotational element coupling device in a supercharger, comprising:
    a rotatable output shaft having tapered external splines and an output shaft axis of rotation;
    a coupling disk having:
        a disk axis of rotation coaxial with the output shaft axis of rotation;
        a tapered internally splined bore coaxial with the disk axis of rotation to engage the tapered external splines; and
        a plurality of disk apertures defined in the coupling disk parallel to the disk axis of rotation;
    a plurality of pins each having a disk end and a timing gear end distal to the disk end, the plurality of pins matingly engaged with the coupling disk at the disk end of the pins via the plurality of disk apertures; and
    a timing gear fixed to a supercharger rotor for rotation therewith, the timing gear having:
        a timing gear axis of rotation; and
        a plurality of timing gear apertures disposed in the timing gear and matingly engaged with the timing gear end of the plurality of pins.

2. The coupling device as defined in claim 1 wherein the coupling disk comprises an aluminum alloy, a steel alloy, or polyether ether keton (PEEK) or combinations thereof.

3. The coupling device as defined in claim 1 wherein the plurality of pins comprises steel.

4. The coupling device as defined in claim 1 wherein the tapered internally splined bore and the tapered external splines of the output shaft are each tapered from about 0.5 degrees to about 2.5 degrees with respect to the disk axis of rotation and the output shaft axis of rotation respectively to render an interference fit between the output shaft and the splined bore.

5. The coupling device as defined in claim 1 wherein a force to seat the output shaft in the coupling disk ranges from about 5 Newtons to about 44 Newtons.

6. The coupling device as defined in claim 1 wherein the tapered internally splined bore has tapered side fit splines to interface with the tapered external splines having a complementary spline profile.

7. The coupling device as defined in claim 1 wherein a parallel misalignment from about 0.05 mm (millimeter) to about 0.1 mm between the output shaft axis of rotation and the timing gear axis of rotation.

8. The coupling device as defined in claim 1 wherein the plurality of pins are substantially equally spaced apart along a circular pattern.

9. A method of making a supercharger, the method comprising:
    disposing in a supercharger housing a rotatable output shaft supported by bearings, the rotatable output shaft having tapered external splines and an output shaft axis of rotation;
    pressing a coupling disk on the rotatable output shaft, the coupling disk having:
        a disk axis of rotation coaxial with the output shaft axis of rotation;
        a tapered internally splined bore coaxial with the disk axis of rotation to engage the tapered external splines; and
        a plurality of disk apertures defined in the disk parallel to the disk axis of rotation;
    disposing in the supercharger housing a rotor assembly having a rotor shaft disposed therein;
    disposing a timing gear on the rotor shaft, the timing gear having a timing gear axis of rotation and a plurality of timing gear apertures disposed in the timing gear; and
    coupling the timing gear to the coupling disk via a plurality of pins, the plurality of pins each having a disk end and a timing gear end distal to the disk end, the coupling being accomplished by:
        matingly engaging the plurality of pins with the coupling disk at the disk end of the pins via the plurality of disk apertures; and
        matingly engaging the plurality of pins with the timing gear at the timing gear end of the plurality of pins via the plurality of timing gear apertures.

10. The method as defined in claim 9 wherein the coupling disk comprises an aluminum alloy, a steel alloy, or polyether ether keton (PEEK) or combinations thereof.

11. The method as defined in claim 9 wherein the plurality of pins comprises steel.

12. The method as defined in claim 9 wherein the tapered internally splined bore and the tapered external splines of the output shaft are each tapered from about 0.5 degrees to about 2.5 degrees with respect to the disk axis of rotation and the output shaft axis of rotation respectively to render an interference fit between the output shaft and the internally splined bore.

13. The method as defined in claim 9 wherein pressing the coupling disk on the rotatable output shaft includes applying a force to seat the output shaft in the coupling disk, the force ranging from about 5 Newtons to about 44 Newtons.

14. The method as defined in claim 9 wherein the tapered internally splined bore has tapered side fit splines to interface with the tapered external splines having a complementary spline profile.

15. The method as defined in claim 9 wherein a parallel misalignment from about 0.05 mm (millimeter) to about 0.1 mm between the output shaft axis of rotation and the timing gear axis of rotation.

16. The method as defined in claim 9 wherein the plurality of pins are substantially equally spaced apart.

* * * * *